ial Feb. 2, 1937

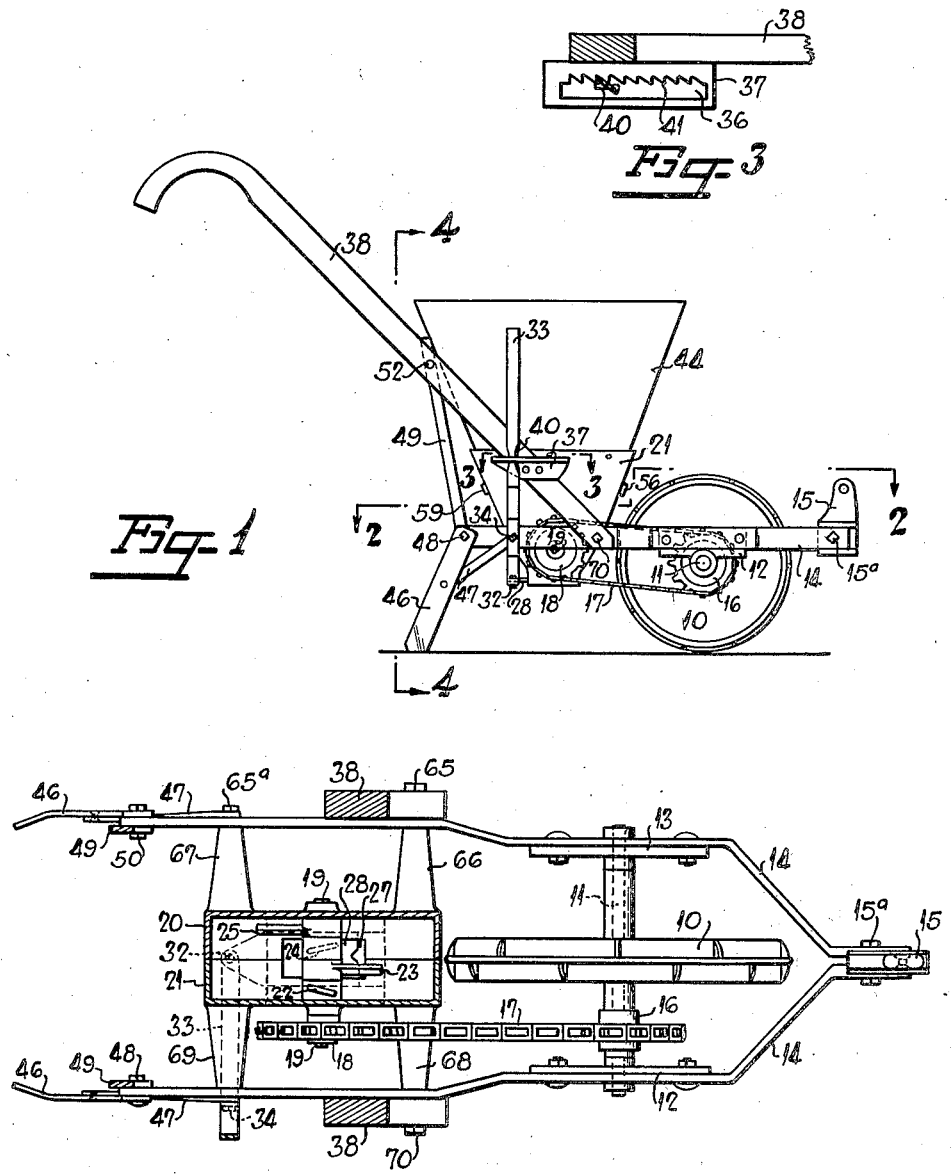

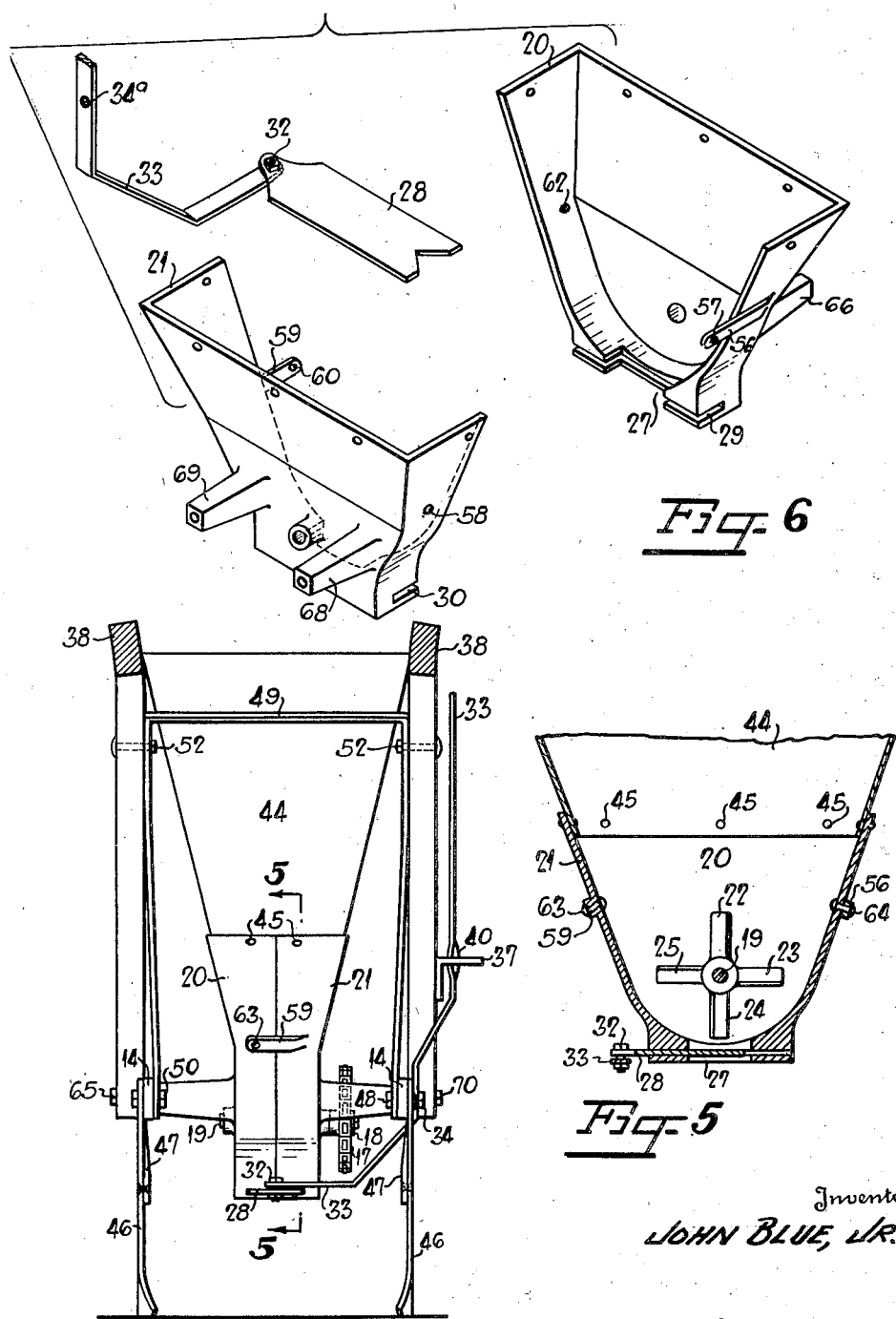

2,069,350

UNITED STATES PATENT OFFICE 2,069,350

GUANO DISTRIBUTOR

John Blue, Jr., Laurinburg, N. C.

Application February 21, 1936, Serial No. 65,085

1 Claim. (Cl. 221—118)

This invention relates to a guano distributor and more especially to a distributor comprising a hopper with means therein for stirring the guano and a suitable gate disposed in the bottom of said hopper capable of being adjusted to regulate the flow of the guano from the hopper.

It is, therefore, an object of this invention to provide a guano distributor having a minimum number of parts with a very simple mode of operation which will enable one to manufacture the same at a comparatively small cost and at the same time will be capable of performing the work of a more expensive distributor.

It is a further object of this invention to provide a guano distributor whose hopper base is composed of two pieces, said pieces being identical so that the same may be inter-changed. By providing a hopper base of this type it is possible to cast both of the pieces from the same mold and thereby simplify the structure. This feature also eliminates the necessity of carrying an additional piece of a different shop mark in stock in order to accommodate customers who wish to obtain repair parts.

It is a further object of this invention to provide a guano distributor comprising a ground wheel supporting a framework, a hopper supported by said framework for carrying a supply of guano therein, means disposed in said hopper for stirring said guano, and an adjustable sliding gate in the bottom of said hopper for regulating the size of the opening through which the guano is expelled.

Some of the objects of the invention having been stated, other objects will appear as the description proceeds, when taken in connection with the accompanying drawings, in which:—

Figure 1 is a side elevation of a guano distributor made in accordance with the invention;

Figure 2 is a sectional plan view taken along the line 2—2 in Figure 1;

Figure 3 is a sectional plan view taken along the line 3—3 in Figure 1;

Figure 4 is a vertical sectional view taken along the line 4—4 in Figure 1;

Figure 5 is a longitudinal sectional detail view taken along the line 5—5 in Figure 4;

Figure 6 is an exploded isometric view of the base of the hopper and the slidable gate associated therewith.

Referring more specifically to the drawings, the numeral 10 denotes a suitable ground wheel which is rotatably mounted upon a shaft 11, said shaft 11 being fixedly secured in brackets 12 and 13 secured to framework 14. A draw bar 15 is connected to the front end of framework 14 as at 15a. Fixedly secured on the hub of ground wheel 10 is a suitable sprocket 16 which has mounted thereon a sprocket chain 17 which chain, in turn, is mounted on another sprocket 18. The sprocket 18 is fixedly secured on the end of shaft 19 which shaft is rotatably mounted in the base of the hopper comprising members 20 and 21 which will be described later as being identical in all respects, and can be turned end for end and fitted together to form a hopper unit.

The shaft 19 has fixedly secured thereon prongs 22, 23, 24 and 25 which rotate with the shaft and stir the guano which is disposed in the hopper to insure that the same will fall downwardly through the opening 27 in the base of the hopper. The size of the opening 27 is regulated by means of a suitable sliding gate 28, said gate 28 being slidably mounted in slots 29 and 30 in members 20 and 21. Loosely secured to the gate 28 as at 32, is a lever 33. This lever projects upwardly and is pivoted on stud bolt 34 to the side of framework 14, which bolt penetrates hole 34a. From this point the lever extends upwardly and through a suitable slot 36 in rack member 37 (Fig. 3), which rack member is secured to the side of one of the handles 38. Where the member 33 penetrates the slot 36 it will be noted that this lever is twisted as at 40 in order that one edge thereof might properly engage the teeth 41 of the rack.

The member 33 normally engages the rack piece 41 at all times by virtue of the lateral spring pressure of the lever against the teeth. It is evident that when it is desired to open the gate the lever 33 is rotated in a clockwise manner about pivot point 34, which in turn, will move the gate 28 to the left in Figures 1 and 2 to cause the opening 27 to be increased in size.

The lower portion of the hopper, comprising members 20 and 21, has secured to the upper end thereof an additional hopper member 44 by any suitable means such as rivets 45. Secured to the trailing end of frame members 14 are suitable hoes 46 which serve as a support for the trailing end of the distributor as well as to cover up the guano after it has been expelled through the opening 27 onto the ground. These hoes are held in position by suitable means such as braces 47.

An inverted U-shaped member 49 has its lower ends secured as at 48 and 50 to the trailing edge of frame members 14. Secured to the upper portion of the inverted U-shaped member 49 are handles 38 by any suitable means such as bolts 52.

The member 20, comprising one-half of the lower portion of the hopper has a lug 56 (Fig. 6), extending therefrom with a hole 57 in the end thereof which is adapted to coincide with another hole 58 in member 21. Likewise, member 21 has a lug 59 extending therefrom with a hole 60 in the end thereof which coincides with a hole 62 in the member 20 when the parts are in an assembled position. After the holes have been made to coincide, suitable rivets or bolts 63 and 64 are inserted in these holes to firmly hold the two pieces in an assembled position. The member 20 also has extending therefrom a pair of projections 66 and 67 which are secured to the framework 14 by any suitable means such as stud bolts 65 and 65a. Likewise portion 21 has projections 68 and 69 projecting therefrom which are secured to the frame portion 14 by any suitable means such as stud bolts 34 and 70.

By referring to Figure 6 it is seen that these pieces are identical in all respects, that is, by turning the portion 20, end for end, the parts will occupy the same position as the parts of portions 21, therefore, it is seen that both of these pieces can be made from the same mold, thus eliminating the necessity of carrying an additional piece with a different shop mark in the repair stock and at the same time reducing the cost of manufacture by eliminating an additional mold.

In the drawings and specification there has been set forth a preferred embodiment of the invention, and although specific terms are employed, they are used in a generic and descriptive sense only, and not for purposes of limitation, the scope of the invention being set forth in the appended claim.

I claim:

A hopper for a guano distributor comprising two identical portions adapted to be joined together along a vertical plane, the rear end of one portion having a projection overlapping the rear end of the other section and the front end of said other section having a projection overlapping the front end of the first section, means for securing the overlapping portions to the respective ends, said sections when secured together having an opening in their bottom portions and a gate slidably mounted in said opening, each of said sections having a pair of outwardly projecting portions each having a horizontally disposed threaded hole for receiving means for supporting the hopper.

JOHN BLUE, Jr.